(12) United States Patent
Ozbutun et al.

(10) Patent No.: US 7,103,608 B1
(45) Date of Patent: Sep. 5, 2006

(54) METHOD AND MECHANISM FOR STORING AND ACCESSING DATA

(75) Inventors: Cetin Ozbutun, San Carlos, CA (US); Dmitry M. Potapov, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 376 days.

(21) Appl. No.: 10/144,689

(22) Filed: May 10, 2002

(51) Int. Cl.
 *G06F 17/30* (2006.01)
 *G06F 7/00* (2006.01)
 *G06F 12/02* (2006.01)

(52) U.S. Cl. .................. 707/102; 707/101; 707/204

(58) Field of Classification Search ............... 707/1, 707/2, 204, 102, 101
 See application file for complete search history.

(56) References Cited

U.S. PATENT DOCUMENTS

| | | | |
|---|---|---|---|
| 4,862,167 A | 8/1989 | Copeland, III | 341/107 |
| 5,237,460 A | 8/1993 | Miller et al. | 360/8 |
| 5,357,431 A | 10/1994 | Nakada et al. | |
| 5,414,634 A | 5/1995 | Alexander et al. | |
| 5,426,426 A | 6/1995 | Hymel | |
| 5,627,995 A | 5/1997 | Miller et al. | 397/497.02 |
| 5,787,415 A * | 7/1998 | Jacobson et al. | 707/2 |
| 5,918,225 A | 6/1999 | White et al. | |
| 5,936,560 A | 8/1999 | Higuchi | 341/106 |
| 6,006,232 A | 12/1999 | Lyons | |
| 6,112,209 A | 8/2000 | Gusack | |
| 6,199,070 B1 | 3/2001 | Polo-Wood et al. | |
| 6,205,453 B1 * | 3/2001 | Tucker et al. | 715/503 |
| 6,208,273 B1 | 3/2001 | Dye et al. | 341/51 |
| 6,360,300 B1 | 3/2002 | Corcoran et al. | 711/139 |
| 6,374,266 B1 | 4/2002 | Shnelvar | 707/204 |
| 6,427,145 B1 | 7/2002 | Hara et al. | |
| 6,721,751 B1 | 4/2004 | Furusho | |
| 6,760,907 B1 | 7/2004 | Shaylor | 717/158 |
| 6,823,329 B1 * | 11/2004 | Kirk et al. | 707/2 |
| 2002/0073298 A1 | 6/2002 | Geiger et al. | 711/206 |
| 2002/0107988 A1 | 8/2002 | Jordan | 709/247 |
| 2003/0009595 A1 * | 1/2003 | Collins | 709/247 |
| 2003/0023536 A1 * | 1/2003 | Hollerman et al. | 705/37 |
| 2003/0028509 A1 * | 2/2003 | Sah et al. | 707/1 |
| 2003/0065662 A1 * | 4/2003 | Cosic | 707/9 |

(Continued)

FOREIGN PATENT DOCUMENTS

EP  0 079 465 A2  5/1983

OTHER PUBLICATIONS

DBA Certified Professional DBA Certification Exam Guide, by Jason S. Couchman, Osborne McGraw-Hill, 1998 (also an Oracle Press Edition).*

(Continued)

*Primary Examiner*—Greta Robinson
*Assistant Examiner*—Kuen S. Lu
(74) *Attorney, Agent, or Firm*—Bingham, McCutchen LLP

(57) ABSTRACT

A method and mechanism is disclosed for implementing storage and retrieval of data in a computing system. Data compression is performed on stored data by reducing or eliminating duplicate values in a database block. Duplicated values are eliminated within the set of data that is to be stored within a particular data storage unit. Rather than writing the duplicated data values to the data storage unit, the on-disk data is configured to reference a symbol table a single copy of each duplicated data value. Column reordering may be performed in an embodiment to further improve compression efficiency. The column reordering may be performed to allow efficient removal of trailing NULL values from on-disk storage.

57 Claims, 9 Drawing Sheets

U.S. PATENT DOCUMENTS

2003/0212694 A1* 11/2003 Potapov et al. ............. 707/100
2004/0034616 A1* 2/2004 Witkowski et al. ............ 707/1

OTHER PUBLICATIONS

Shannon, C.E., "A Mathematical Theory of Communication", The Bell System Technical Journal, vol. 27, pp. 379-423, 623,656, Jul. Oct. 1948, Reprint pp. 1-55.

Westmann, Till et al., "The Implementation and Performance of Compressed Databases", Reihe Informatik, Mar. 1998.

comp.compression Frequently Asked Questions (part 1/3), http://www.faqs.org/faqs/compression-faq/part1/, Last-modified: Sep. 5, 1999, pp. 1-65.

comp.compression Frequently Asked Questions (part 2.3), http://www.faqs.org/faqs/compression-faq/part2/, Last-modified Sep. 5, 1999, pp. 1-37.

comp.compression Frequently Asked Questions (part 3/3), http://www.faqs.org/faqs/compression-faq/part3/, Last-modified Feb. 7, 1996, pp. 1-13.

Bassiouni, M.A., "Data Compression in Scientific and Statistical Databases," *IEEE Transactions on Software Engineering*, (1985), vol. SE-11, No. 10, pp. 1047-1058.

Bayer, R. et al., "Organization and Maintenance of Large Ordered Indexes," *Acta Informat.*, (1972) vol. 1, pp. 173-189.

Beckmann, N. et al., "The R*-Tree: An Efficient and Robust Access Method for Points and Rectangles," *ACM SIGMOD* (1992) pp. 322-331.

Berchtold, S. et al., "The X-Tree: An Index Structure for High-Dimensional Data," *VLDB* (1996), pp. 28-39.

Eggers, S. J. et al., "A Compression Technique for Large Statistical Databases," *VLDB* (1981), pp. 424-434.

Goldstein, J. et al., "Compressing Relations and Indexes," Technical report No. 1355, CS Dept., University of Wisconsin-Madison (1997) pp. 1-23.

Guttman, Antonin, "R-Trees: A Dynamic Index Structure for Spatial Searching," *ACM SIGMOD* (1984), pp. 47-57.

Leuteneger, S.T. et al., "STR: A Simple and Efficient Algorithm for R-Tree Packing," Tech. Report, Mathematics and Computer Science Dept., University of Denver (1996) No. 96-02, pp. 1-29.

Lin, K.I. et al., The TV-Tree: An Index Structure for High-Dimensional Data, *VLDB journal* (1994), vol. 3, No. 4, pp. 517-542.

Ng, W. K. et al., "Relational Database Compression Using Augmented Vector Quantization," *IEEE 11th International Conference on Data Engineering* (1995), pp. 540-549.

Nievergelt, J. et al, "The Grid File: An Adaptable, Symmetric Multikey File Structure," *Readings in Database Systems*, (1988) Morgan Kaufmann, 582-598.

O'Neil, P. et al., "Improved Query Performance with Variant Indexes," *ACM SIGMOD* (1977), pp. 38-49.

Roth, M.A. et al., "Database Compression," *SIGMOD Record*, (1993) vol. 22, No. 3, pp. 31-39.

Seeger, B. et al., "The Buddy-Tree: An Efficient and Robust Method for Spatial Data Base Systems," *VLDB* (1990), pp. 590-601.

Ziv, J., et al, "A Universal Algorithm for Sequential Data Compression," *IEEE Transactions on Information Theory*, (1977) vol. 31, No. 3, pp. 337-343.

Benveniste et al. "Cache-memory interfaces in compressed memory systems" IEEE Transactions on Computers (Nov. 2001) 50(11):1106-1116.

de Castro et al. "Adaptive compressed caching: Design and Implementation" Proceedings of the 15th Symposium on Computer Architecture and High Performance Computing (Nov. 2003) pp. 10-18.

Chen, W.T. et al. "Counter for Full Table Scan Control in Data Redistribution", *IBM Technical Disclosure Bulletin* (Sep. 1992), vol. 35, No. 4B, pp. 3-4.

Chen, Z. and P. Seshadri "An Algebraic Compression Framework for Query Results" Data Engineering 2000, Proceedings of the 16th International Conference on San Diego, CA, USA, Feb. 29-Mar. 3, 2000, *IEEE Comp. Soc.* (Feb. 29, 2000) pp. 177-188.

Cockshott, W.P. et al. "Data Compression in Database Systems" Database and Expert Systems Applications 1998, Proceedings of the 9th International Workshop on Vienna, AT, Aug. 26-28, 1998 *IEEE Comp. Soc.* (Aug. 26, 1998) pp. 981-990.

Goldstein, J. et al. "Compressing Relations and Indexes" Data Engineering 1998, Proceedings of the 14th International Conference on Orlando, FL, USA, Feb. 23-27, 1998, *IEEE Comput. Soc.* (Feb. 23, 1998) pp. 370-379.

Graefe, G. and L.D. Shapiro "Data Compression and Database Performance" Applied Computing 1991, Proceedings of the 1991 Symposium on Kansas City, MO, USA, Apr. 3-5, 1991 *IEEE Comp. Soc.* (Apr. 3, 1991) pp. 22-27.

Haerder, T. et al. "Speicherungsstrukturen" *Datenbanksysteme: Konzepte und Techniken der Implementierung* (1999), Book excerpt, pp. 143-175.

Ng, W.K. and C.V. Ravishankar "Relational Database Compression Using Augmented Vector Quantization" Data Engineering 1995, Proceedings of the 11th International Conference on Taipei, TW, Mar. 6-10, 1995, *IEEE Comp. Soc.* (Mar. 6, 1995) pp. 540-549.

Olken, F. and D. Rotem "Rearranging Data to Maximize the Efficiency of Compression" *J. Comp. Sys. Sci.* (Apr. 1989) 38(2):405-430.

Segev, A. and A. Chatterjee "Supporting Statistics in Extensible Databases: A Case Study" Scientific and Statistical Database Management 1994, Proceedings of the 7th International Working Conference on Charlottesville, VA, USA, Sep. 28-30, 1994, *IEEE Comput. Soc.* (Sep. 28, 1994), pp. 54-63.

International Search Report dated May 24, 2004 (PCT/US2003/001484).

Written Opinion dated Jul. 29, 2004 (PCT/US2003/001484).

* cited by examiner

METHOD AND MECHANISM FOR STORING AND ACCESSING DATA

BACKGROUND AND SUMMARY

The invention relates to computer systems, and more particularly to a method and mechanism for storing and retrieving data in a computer system.

As many modern businesses and organizations continually increase their need to access greater amounts of information, the quantity of data that must be stored in databases and computer systems likewise increases. A significant portion of the expense for storing a large quantity of information is related to the costs to purchase and maintain data storage systems. Given this expense, approaches have been suggested to reduce the amount of space that is needed to store a given quantity of data.

Data compression is a suggested technique in many modern computer systems to reduce the storage costs for data. A common approach for implementing compression is to compress data at the granularity of the file. For example, traditional compression approaches such as the Unix-based gzip or DOS-based zip compress an entire file into a more-compact version of that file. A drawback with this type of approach is that if an entire file is compressed, all or a large part of the file must be decompressed before any part of it can be used, even if only a small part of the file is actually needed by a user. This is a problem that particularly exists with respect to compressing files in database systems, in which a single database file may contain large quantities of database records, but only a small portion of the individual records may be needed at any moment in time. Thus, the granularity of compression/decompression may not realistically match the granularity at which data is desirably used and accessed in the system.

Moreover, compression granularities for other traditional compression algorithms could result in storage inefficiencies. For example, certain page-at-a-time compression approaches could lead to compressed pages of different sizes that are inefficiently mapped onto physical pages. Furthermore, many traditional compression techniques do not even guarantee that data size will not increase after compression.

In addition, the very acts of compressing and decompressing data could consume an excessive amount of overhead. The overhead is typically related to the specific compression algorithm being used as well as the quantity of data being compressed/decompressed. This overhead could contribute to significant latency when seeking to store or retrieve information in a computer system. Given the latency problem as well as less-than-certain compression gains, the trade-off between time and space for compression is not always attractive in a database or other type of computing system.

Embodiments of the present invention provide a method and mechanism for implementing storage and retrieval of data in a computing system. According to an embodiment of the invention, data compression is performed on stored data by reducing or eliminating duplicate values in a database block or other storage unit. In this embodiment, duplicated values are eliminated within the set of data that is to be stored within a particular data storage unit. Rather than writing the duplicated data values to the data storage unit, the on-disk data is configured to reference a single copy of each duplicated data value through a symbol table. Because only duplicated data values are removed, and data values are not individually subject to potentially useless data compression algorithms, the invention can be configured to ensure that the on-disk data size will not exceed the original data size at the expense of a single structure or bit in a block header. Moreover, since such a reference to a symbol table is all that is required to access duplicated data, data access is not significantly impaired in this approach. Also disclosed for an embodiment is recursive referencing of values in the symbol table. Column reordering may be performed in an embodiment to further improve compression efficiency. The column reordering may be performed to allow efficient removal of trailing NULL values from on-disk storage. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention provides a method and mechanism for storing and retrieving data from a data storage system. For the purpose of explanation, throughout this document the term "disk" or "disk system" is used to refer to data storage systems, but the inventive concepts disclosed herein may also be applied to other types of storage systems besides disk-based systems. In addition, the following description will be made with respect to the storage/retrieval of relational data from a database. It is noted, however, that the present invention is applicable to managing other types and granularities of data in a computing system, and thus is not to be limited to compression of just relational data.

According to an embodiment of the invention, data compression is performed on stored data by reducing or eliminating duplicate values in a database block. An identification is made of duplicated values within the set of data that is to be stored within a particular data storage unit. Rather than writing all of these duplicated data values to the data storage unit, a symbol table is created that stores each duplicated data value only once. Each portion of the data item that refers to the duplicated data values are configured to effectively reference the single version of that data value located in the symbol table. As illustrated herein, the data storage units are shown as database blocks or disk pages, but other data storage units may likewise be used in the invention. In one embodiment, the database block is self-contained such that the information that is needed to recreate the uncompressed data in a block is available within the block.

Figure 1:
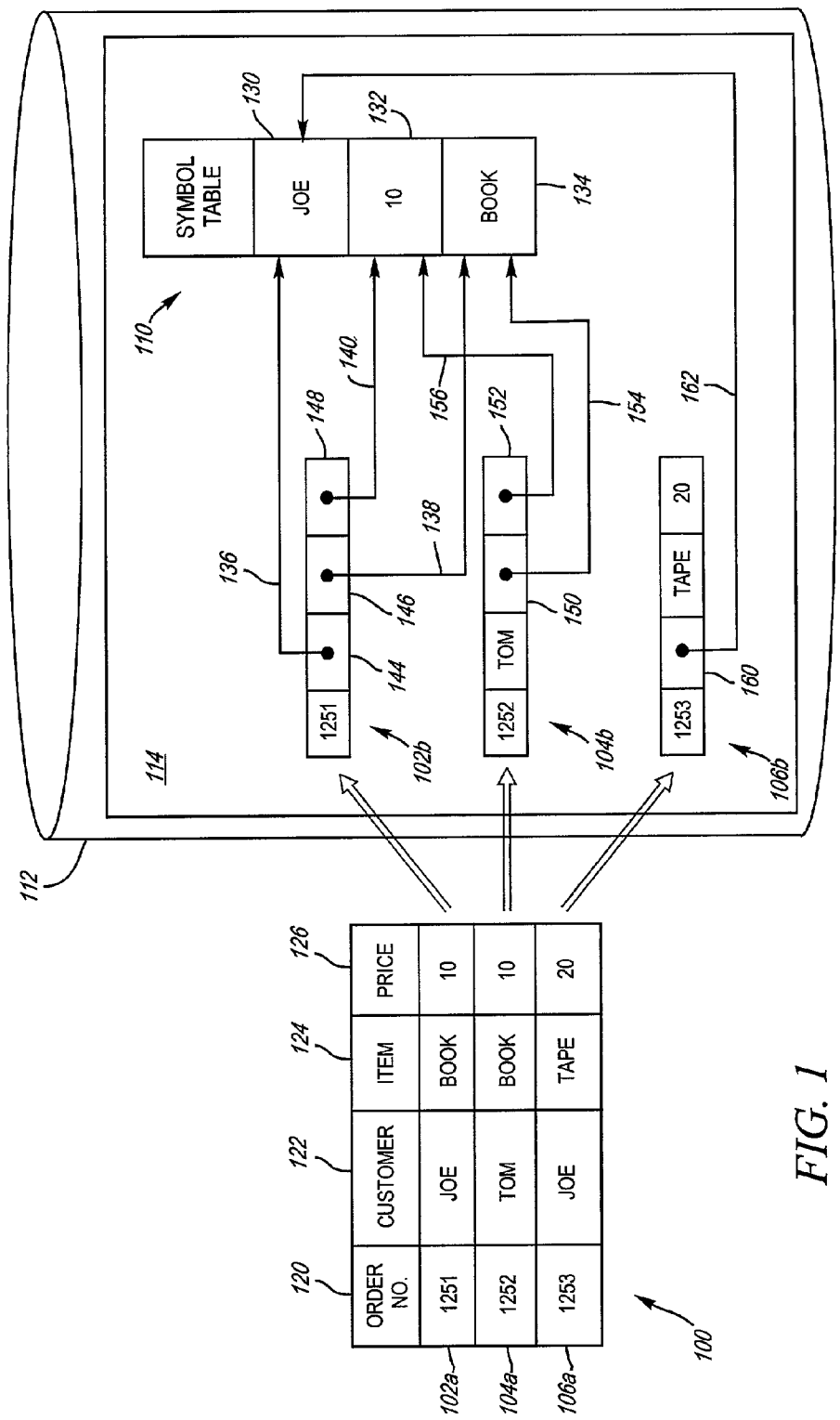
FIG. 1 shows a data storage structure according to an embodiment of the invention.

FIG. 1 illustrates this embodiment of the invention. Shown is a database table 100 that is to be stored to a block 114 on disk 112. Each row in table 100 includes four columns of information, including an order number column 120, a customer column 122, an item column 124, and a price column 126. Three rows of data are shown in table 100. Row 102a has the value "1251" in the order column 120, the value "Joe" in the customer column 122, the value "Book" in the item column 124, and the value "10" in the price column 126. Row 104a has the value "1252" in the order column 120, the value "Tom" in the customer column 122, the value "Book" in the item column 124, and the value "10" in the price column 126. Row 106a has the value "1253" in the order column 120, the value "Joe" in the customer column 122, the value "Tape" in the item column 124, and the value "20" in the price column 126.

It is noted that the value "Joe" is repeated in the customer column 122 for both rows 102a and 106a. Similarly, the value "Book" is repeated in the item column 124 for rows 102a and 104a. The value "10" is repeated in the price column 126 for rows 102a and 104a.

A symbol table 110 is created to store each duplicated data value. In particular, the duplicated value "Joe" is stored in symbol table entry 130, the duplicated value "10" is stored in symbol table entry 132, and the duplicated value "Book" is stored in symbol table entry 134.

When each row of data in table 100 is stored to block 114 on disk 112, the repeated data values are not again written to disk. Instead, corresponding portions of each row are configured to reference the appropriate symbol entry in symbol table 110 that contains the correct data value, e.g., using pointer or linking structures.

To illustrate, consider row 102a in table 100 which includes the following column values: "1251", "Joe", "Book", and "10". It is noted that the symbol table 110 includes an entry for the "Joe", "Book", and "10" values, which are the duplicated data values in table 100 that appeal in row 102a.

As row 102a is written to disk, only the unique value "1251" is individually written to disk. This is shown in the on-disk row structure 102b which corresponds to row 102a in table 100. On-disk row structure 102b includes a first portion 142 corresponding to the order number column 120, which includes the unique data value "1251" for row 102a.

For the duplicated data values, pointers or links are inserted into the appropriate portions of the on-disk row structure to point to the appropriate entry in symbol table 110. On-disk row structure 102b includes a portion 144 corresponding to the customer column 122, which has a duplicated data value "Joe" in the original row 102a, that is configured in the on-disk row structure 102b to include a pointer 136 to the symbol table entry 130 that matches this duplicated data value. On-disk row structure 102b includes a portion 146 corresponding to the item column 124, which has a duplicated data value "Book" in the original row 102a, that is configured in the on-disk row structure 102b to include a pointer 138 to the symbol table entry 134 that matches this duplicated data value. On-disk row structure 102b includes a portion 148 corresponding to the price column 126, which has a duplicated data value "10" in the original row 102a, that is configured in the on-disk row structure 102b to include a pointer 140 to the symbol table entry 132 that matches this duplicated data value.

Each of the other rows 104a and 106a in table 100 is similarly represented when stored into block 114 on disk 112. Thus, row 104a in table 100 is written to disk as on-disk row structure 104b. In row 104a, the unique data values are "1252" and "Tom," which are individually written into on-disk row structure 104b. Row 104a also includes duplicated row values "Book" and "10." The portion 150 of on-disk row structure 104b corresponding to data value "Book" is configured to include a pointer 154 to entry 134 in symbol table 110, which corresponds to this duplicated data value. The portion 152 of on-disk row structure 104b corresponding to data value "10" is configured to include a pointer 156 to entry 132 in symbol table 110, which corresponds to this duplicated data value. Row 106a in table 100 is written to disk as on-disk row structure 106b. In row 106a, the unique data values are "1253", "Tape", and "20", which are individually written into on-disk row structure 106b. Row 106a also includes the duplicated row value "Joe". The portion 160 of on-disk row structure 106b corresponding to data value "Joe" is configured to include a pointer 162 to entry 130 in symbol table 110, which corresponds to this duplicated data value.

Figure 2:
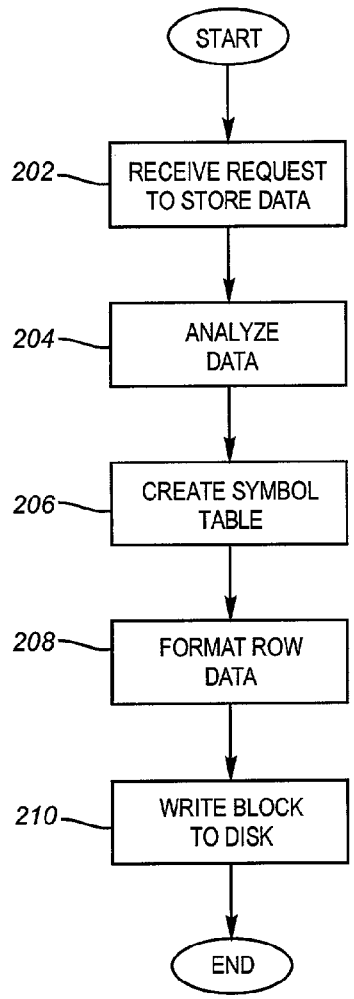
FIG. 2 shows a flowchart of an embodiment of a process for storing data.

FIG. 2 shows a flowchart of an embodiment of a process for storing data onto disk. At 202, a request is received to store data onto disk. In an embodiment, it is a user/system option to determine whether the data is compressed. If compression is turned on, at 204, the data is analyzed to identify repetitive data values for the portions of the data that is to be stored within a given database block. Based upon the identified data duplicates, a symbol table is generated that includes some or all of the duplicate data values (206). Each on-disk row structure in the database block is thereafter created. The on-disk row structures are formatted to exclude some or all of the duplicated data values (208). In particular, on-disk row structures that are associated with a duplicated data value are configured to reference the appropriate entry(s) in the symbol table that stores the relevant data value. If the present compression approach is performed off-line, then the analysis and formatting of rows are performed in batch mode, such that the entire contents of a database block is pre-organized before writing to disk. Off-line processing allows precise determination of the number of rows that will fit into a given database block. Alternatively, the compression approach can be performed on-line, with each on-disk row structure individually prepared and written to disk. In either case, the block metadata is configured to indicate whether the data on the block, or portions of the data in the block, have been compressed. In an embodiment, the header of the block includes a data structure that indicates whether the block or data in the block are compressed. In one embodiment, a single bit is sufficient to indicate whether data on the block is compressed.

If the likelihood of data repetitions within a single block is low, the expected compression ratio will likely also be fairly low. If the likelihood of such repetitions is higher, the expected compression ratio will be higher. Thus, rows can be reorganized to increase the likelihood of such repetitions. One way to do this for a single column table is to order table rows by the column value. This can be achieved in the Structured Query Language (SQL) by executing the statement "CREATE TABLE AS SELECT" with an order by clause. This type of technique can be also applied to a table where one column has low cardinality and other columns have high cardinalities, by ordering table rows by low cardinality column.

For a table with multiple low cardinality columns, tuning to achieve a better compression ratio can be performed using the following approach in one embodiment of the invention. First, determine the column with the lowest cardinality. The cardinality of a column can be determined by executing the following statement: "SELECT COUNT(DISTINCT(c)) from T;". Once the lowest cardinality column is determined (assume it is column C1), the next step is to determine cardinalities of other columns for fixed values of the chosen column. This can be measured by executing the statement "SELECT SUM(count(*) * COUNT(DISTINCT(cK))) from T group by C1;" for all columns cK other than C1. Assume column C2 has the lowest such measure. Then determine the column with the lowest cardinality when the first two are fixed. This can be measured by executing the statement "SELECT SUM(count(*) * COUNT(DISTINCT (cK))) from T group by C1, C2;" for all columns cK other than C1 and C2. By continuing this process, one would determine some column sequence C1, C2 . . . CN. This sequence can be used as the sequence of columns in the ORDER BY clause of the create table compress statement.

Figure 3:
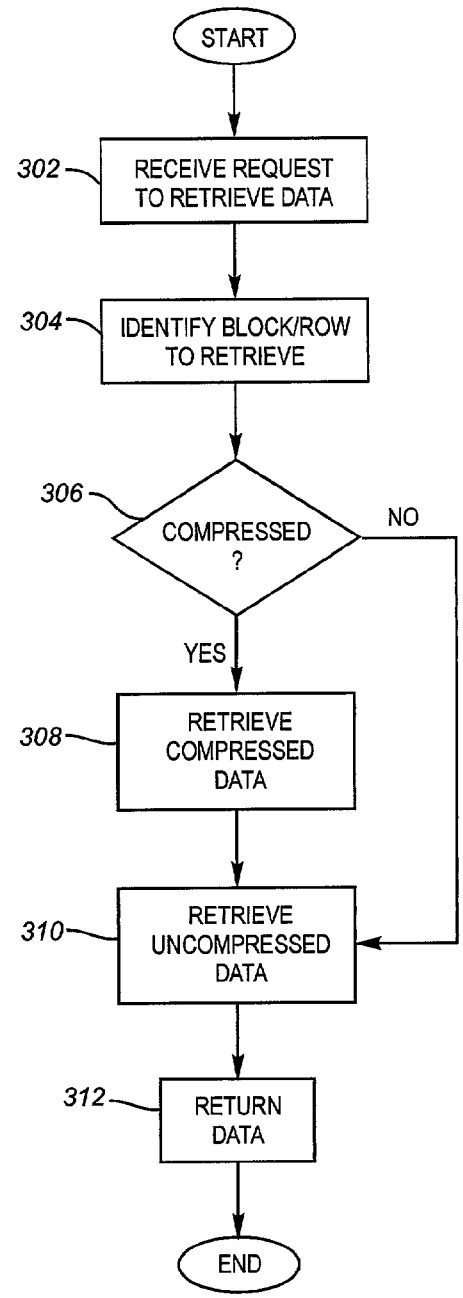
FIG. 3 shows a flowchart of an embodiment of a process for retrieving data.

FIG. 3 shows a flowchart of an embodiment of a process for retrieving data from disk. At 302, a request is received to retrieve data from disk. The specific block/row that is being sought is identified at 304. Any conventional indexing or search techniques may be employed to perform step 304. At 306, a determination is made whether the relevant database block is being stored in compressed format. In an embodiment, the block header is accessed to make this determination. If the block is not compressed, then the requested row information is immediately retrieved from disk (310) and returned to the requesting entity (312). If the block is compressed, then the relevant on-disk row structure for the requested row is accessed to retrieve duplicated data values from the symbol table (308). In addition, the individually stored data values from the on-disk row structure is also retrieved (310). At 312, the complete set of requested data is returned to the requesting entity.

Figure 4:
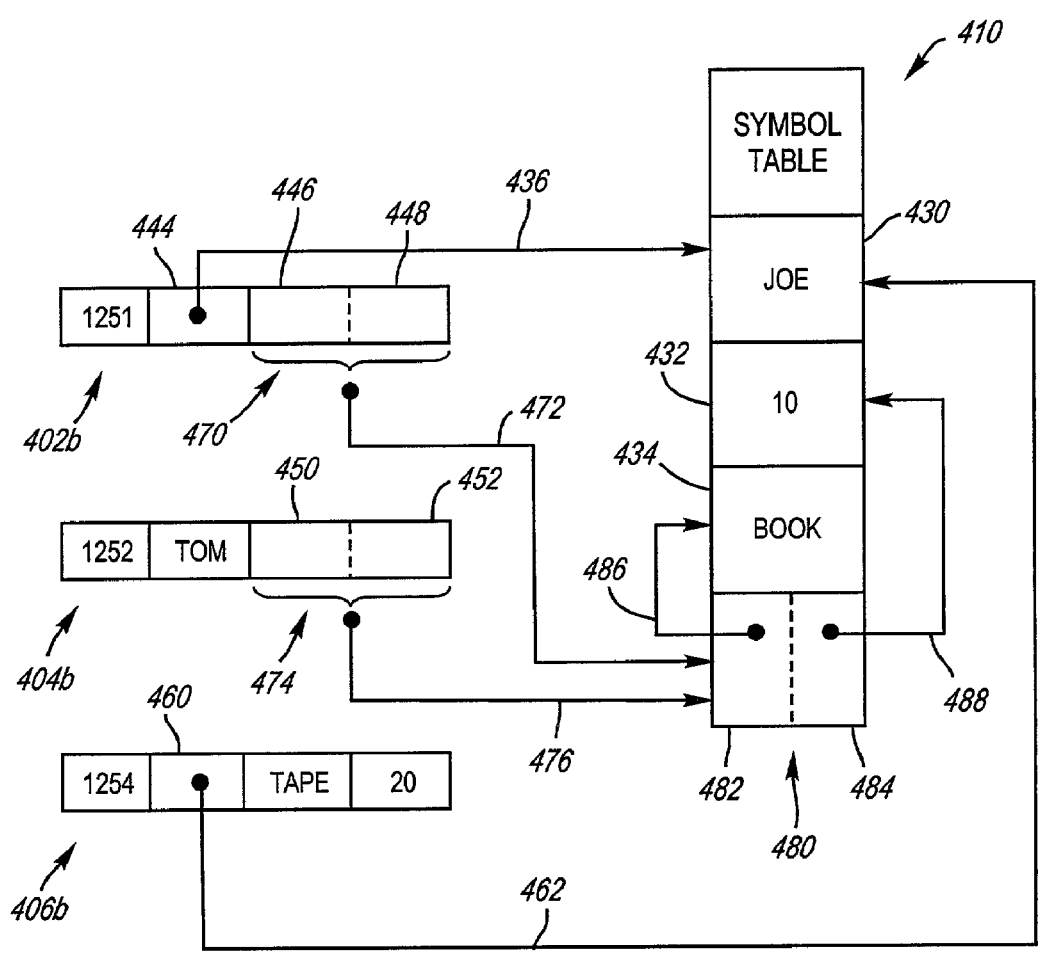
FIG. 4 illustrates recursive referencing of entries in a symbol table according to an embodiment of the invention.

Recursive symbol entries may be used in the symbol table. A recursive symbol entry is an entry in the symbol table that itself references one or more other symbol table entries. FIG. 4 illustrates the use of recursive symbol entries to format a database block to store table 100 of FIG. 1. Like the standard symbol table 110 of FIG. 1, recursive symbol table 410 includes an entry 430 to store the "Joe" data value, an entry 432 to store the "10" data value, and an entry 434 to store the "Book" data value.

Unlike the standard symbol table 110 of FIG. 1, recursive symbol table 410 includes a recursive symbol entry 480 that references other entries within symbol table 410. In particular, recursive symbol entry 480 includes a first portion 482 that is associated with a link 486 to the data value "Book" in entry 434. Recursive symbol entry 480 also includes a second portion 484 that is associated with a link 488 to the data value "10" in entry 432. By combining first portion 482 and second portion 484, entry 480 logically creates an entry that includes both referenced data values in sequence, i.e., having the data value of "Book" directly before the data value "10".

The advantage of combining multiple symbol entries in this manner is that there are sequences of column values for rows stored in the block that may match these combinations. Rather than having multiple links or pointer structures between an on-disk row structure and the individual data values in a symbol table, a single link or pointer structure can be used to point to a combined symbol entry that recursively links to multiple other entries.

Referring to table 100 in FIG. 1, columns 124 and 126 in both row 102a and row 104a present the data values "Book" and "10" in sequence. In FIG. 1, the on-disk row structure 102b (which corresponds to row 102a) includes a link 138 to the data value "Book" and a separate link 140 to the data value "10". Similarly, the on-disk row structure 104b (which corresponds to row 104a) includes a link 154 to the data value "Book" and a separate link 156 to the data value "10". This is a total of four links from these on-disk row structures to entries in the symbol table 110.

In the recursive approach of FIG. 4, the on-disk row structure 402b (which corresponds to row 102a) includes single link 472 to the combined, sequential data values "Book" and "10" represented by recursive symbol entry 480. This single link 472 allows the values of both portions 446 and 448 (corresponding to columns 124 and 126 in row 102a) to be represented in on-disk row structure 402b. Similarly, the on-disk row structure 404b (which corresponds to row 102a) includes single link 476 to the combined, sequential data values "Book" and "10" represented by recursive symbol entry 480. This, again, allows the values of both portions 450 and 452 in on-disk row structure 404b (corresponding to columns 124 and 126 in row 102a) to be represented with a single link or pointer structure. The end result is that the approach of FIG. 4 requires fewer link/pointers between the on-disk row structures and the symbol table as is required by the approach of FIG. 1.

The approach of FIG. 4 to reduce the number of links/ pointers may also be employed with non-recursive combinational entries in symbol table 410. In particular, entry 480 can be configured such that portion 482 explicitly stores the data value "Book", rather than being associated with a recursive link 486 to entry 434. Portion 484 of entry 480 can be configured to explicitly store the data value "10", rather than being associated with a recursive link 488 to entry 432. This approach still allows a reduction in the number of links between the on-disk row structures and the symbol table 410, at the cost of possibly increasing the amount of disk space needed to explicitly store the duplicated values in symbol table 410. Entries in symbol table 410 may also include various combinations of recursive links and explicitly stored data values. While the example of FIG. 4 shows only two data values combined into a recursive symbol entry 480, the inventive concepts can be extended to include any number of data values in a combined symbol table entry.

In one embodiment, column reordering may be performed to improve compression ratios. As noted in the last section, if there are repeating sequences of column values for rows stored in a given block, then the number of links between the symbol table and on-disk row structures can be reduced by creating links to combined entries in the symbol table. Column reordering can be performed to increase the number of duplicated sequences of column values. In an embodiment, column reordering is performed at the granularity level of the database block. Alternatively, column reordering can be performed at other granularities, e.g., across multiple blocks.

Figure 5:
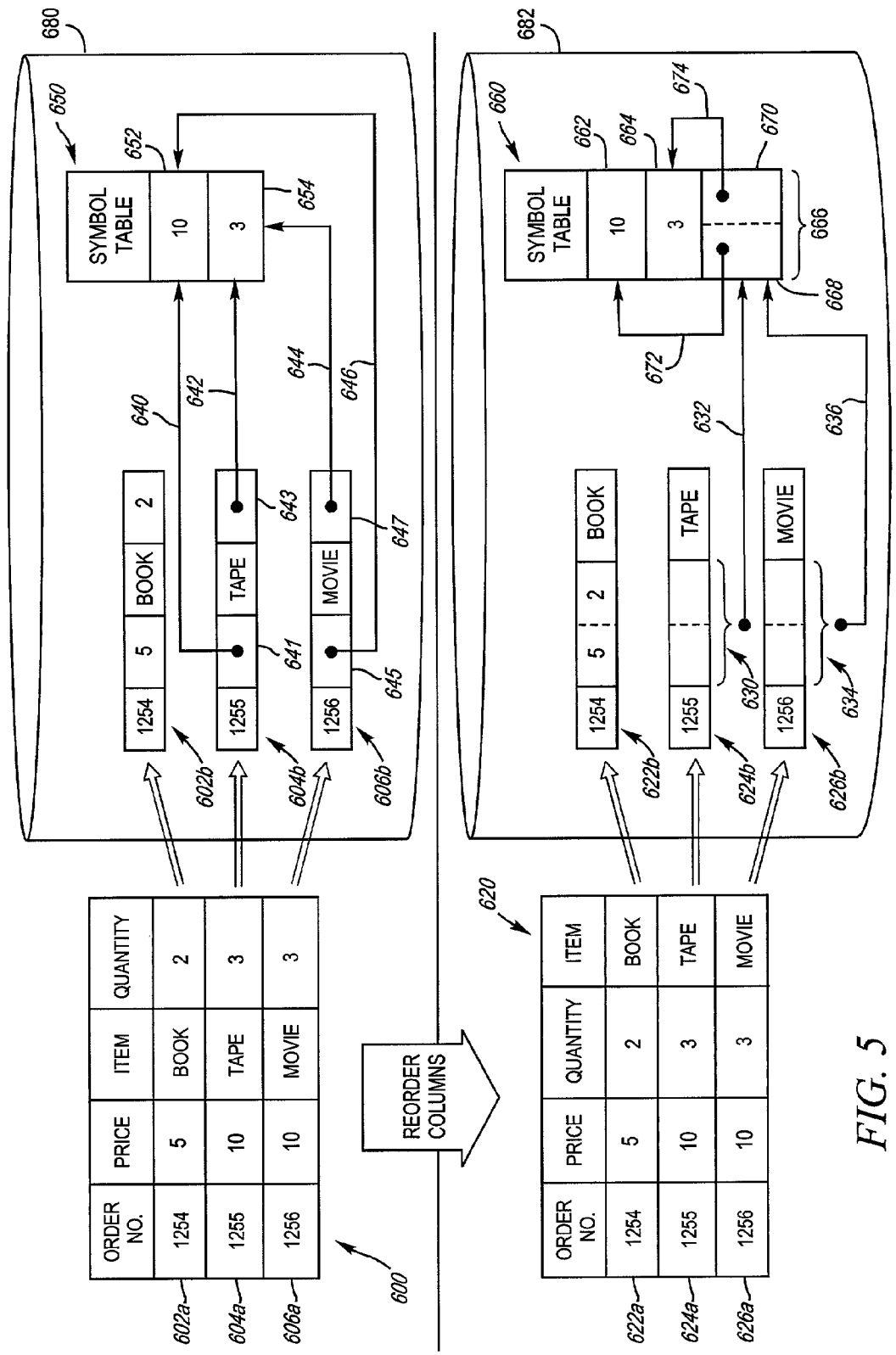
FIG. 5 illustrates column reordering and recursive referencing of entries in a symbol table according to an embodiment of the invention.

To illustrate, consider database table 600 shown in FIG. 5. Table 600 includes three rows of data, with each row having an Order Number column, a Price column, an Item column, and a Quantity column. Row 602a has the following sequence of data values: "1254", "5", "Book", and "2". Row 604a has the following sequence of data values: "1255", "10", "Tape", and "3". Row 606a has the following sequence of data values: "1256", "10", "Movie", and "3".

Consider first the situation if columns are not reordered. It is noted that the data values "10" and "3" are duplicated among these rows. Thus, when this table is written to disk, a symbol table 650 can be created having a first entry 652 with the data value "10" and a second entry 654 with the data value "3". As the rows 602a, 604a, and 606a are written to disk, each on-disk row structure for these rows that is associated with these duplicated data values are configured to reference the appropriate entry in symbol table 650. Thus, on-disk row structure 604b, which corresponds to row 604a, has a portion 641 (corresponding to the data value in the Price column) that is associated with a link 640 to entry 652 in symbol table 650 for the data value "10". On-disk row structure 604b also has a portion 643 (corresponding to the data value in the Quantity column) that is associated with a link 642 to entry 654 in symbol table 650 for the data value "3". On-disk row structure 606b, which corresponds to row 606a, has a portion 645 (corresponding to the data value in the Price column) that is associated with a link 646 to entry 652 in symbol table 650 for the data value "10". On-disk row structure 606b also has a portion 647 (corresponding to the data value in the Quantity column) that is associated with a link 644 to entry 654 in symbol table 650 for the data value "3". Because row 602a does not include any of the duplicated data values, its associated on-disk row structure 602b explicitly stores each column value and does not include any references to the symbol table.

Consider if column reordering is performed against table 600. The column reordering is performed to increase the possibility of repeating sequences of column values for the rows in the table. In the present example, by switching the ordering between the Item column and Quantity column in table 600, it can be seen that a repeating sequence of values is created between the Price column and the Quantity Column. The result of this column reordering is shown as table 620 in FIG. 5. In particular, both rows 624a and 626a now have the same sequence of data values "10" and "3" for the Price and Quantity columns. Thus, when symbol table 660 is created on disk, a combined entry 666 can be inserted that includes, whether directly or indirectly, the data values "10" and "3" in the sequence shown in table 620 for rows 624a and 626a. If the combined entry 666 indirectly includes these values, then entry 666 includes a first portion 668 that recursively references entry 662 and a second portion 670 that recursively references entry 664.

When row 624a is written to disk, its on-disk row structure 624b is associated with a single link 632 to combined entry 666 for the sequence of values "10" and "3". This is in contrast to the approach taken by on-disk row structure 604a for this same row without column reordering, which uses two links 640 and 642 to reference the same two data values. Likewise, when row 626a is written to disk, its on-disk row structure 626b is associated with a single link 636 for the sequence of values "10" and "3". Again, this is in contrast to the approach taken by on-disk row structure 606a for this same row without column reordering, which uses two links 646 and 644 to reference the same two data values.

Figure 6:
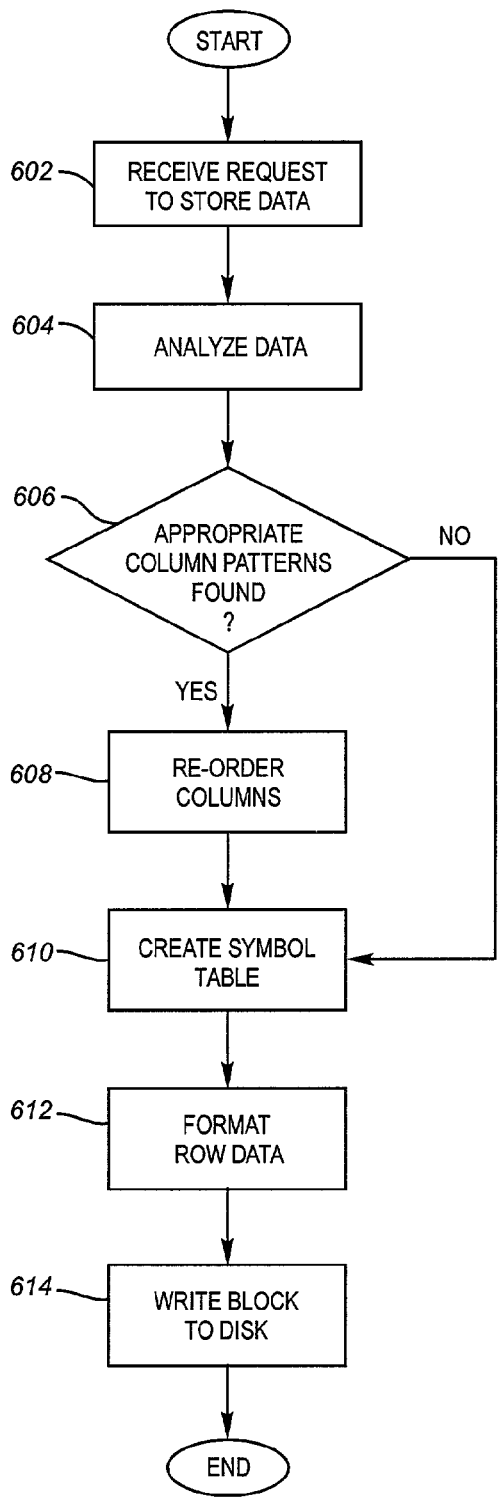
FIG. 6 shows a flowchart of an alternate embodiment of a process for storing data.

FIG. 6 shows a flowchart of an embodiment of a process for storing data to disk utilizing column reordering. At 602, a request is received to store data onto disk. If compression is turned on, at 604, the data is analyzed to identify repetitive data values for the portions of the data that is to be stored within a given database block. The data analysis step also includes an analysis of possible column reordering combinations that may be performed to increase the likelihood of repeating sequences of data values. A determination is made whether there exists column sequences that may be advantageously obtained through column reordering (606). If so, then the appropriate columns are reordered (608). Based upon the identified data duplicates, a symbol table is generated that includes some or all of the duplicate data values (610). Each on-disk row structure in the database block is thereafter created and formatted to exclude the duplicated data values (612) and are written to disk (614). In particular, each on-disk row structure that is associated with a duplicated data value is configured to include or reference a link to the appropriate entry(s) in the symbol table that stores the relevant data value. The block metadata is configured to indicate whether the data on the block, or portions of the data in the block, have been compressed. In addition, the block metadata is also configured to indicate whether and how column reordering was performed to the stored data. In an embodiment, the header of the block includes a data structure that indicates whether the block or data in the block are compressed and/or reordered. When the data is retrieved from the block, the header information is accessed to allow the data to be reordered and uncompressed back to its original form.

An optimization that can be applied is to remove trailing NULL values from the on-disk versions of stored rows. Rows in a database table may include NULL values in the one or more columns at the end of the row. When these rows are written to disk, additional compression can be achieved by not allocating or writing any space to disk for these NULL values. Instead, the storage system is configured to recognize that if the on-disk version of a particular database row does not include one or more stored values for columns at the end of the row, then those column values are assumed to be NULL values.

Figure 7:
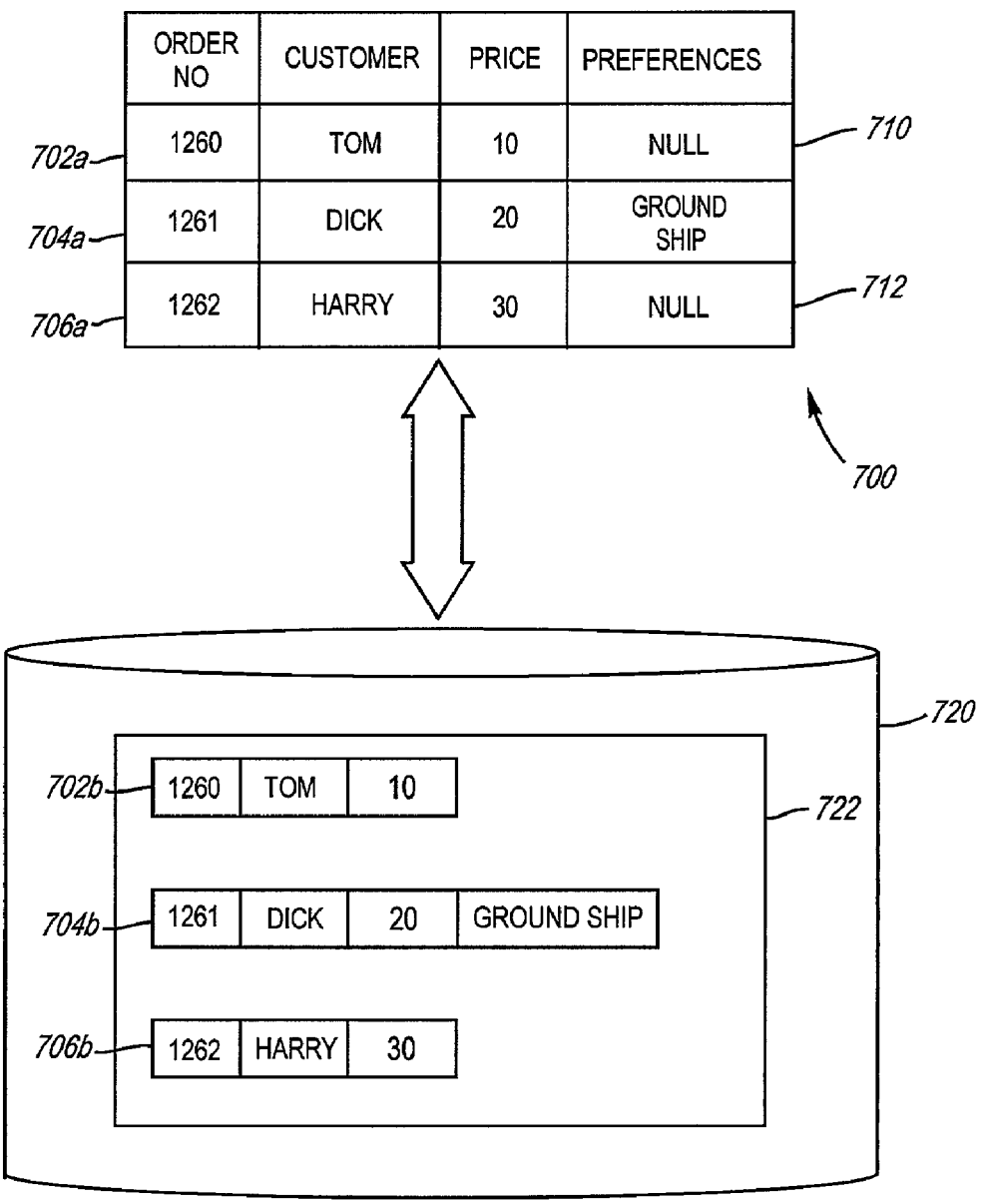
FIG. 7 illustrates removal of trailing NULL values according to an embodiment of the invention.

To illustrate, consider table 700 in FIG. 7, which is to be stored to block 722 on disk 720. It is noted that rows 702a and 706a both have a NULL value in the last column of each row. When these rows are written to disk, the on-disk row structures for these rows are configured to exclude the trailing NULL values. On-disk row structure 702b, which corresponds to row 702a, does not contain a space allocated for the trailing NULL value in the Preferences column. Instead, it only includes allocated space for the leading "1260", "Tom", and "10" values that appear in row 702a. On-disk row structure 706b, which corresponds to row 706a, does not contain a space allocated for the trailing NULL value. Instead, it only includes allocated space for the leading "1262", "Harry", and "30" values that appear in row 706a.

Column reordering can be performed to increase the likelihood of trailing NULL values appearing in rows to be stored on disk. The column values for a set of data is analyzed to sort the columns based upon the number of NULL values in each column. The columns are reordered so that the columns with the largest numbers of NULL values are ordered to the end of the rows, and the columns with the smaller numbers of NULL values are ordered closer to the beginning of the rows. Thus, the column with the largest number of NULL values may be reordered to the end of the table. The column with the next-largest number of NULL values may be reordered as the second-to-last column of the table, with these sequences of actions continued until an efficient ordering of columns is achieved.

Figure 8:
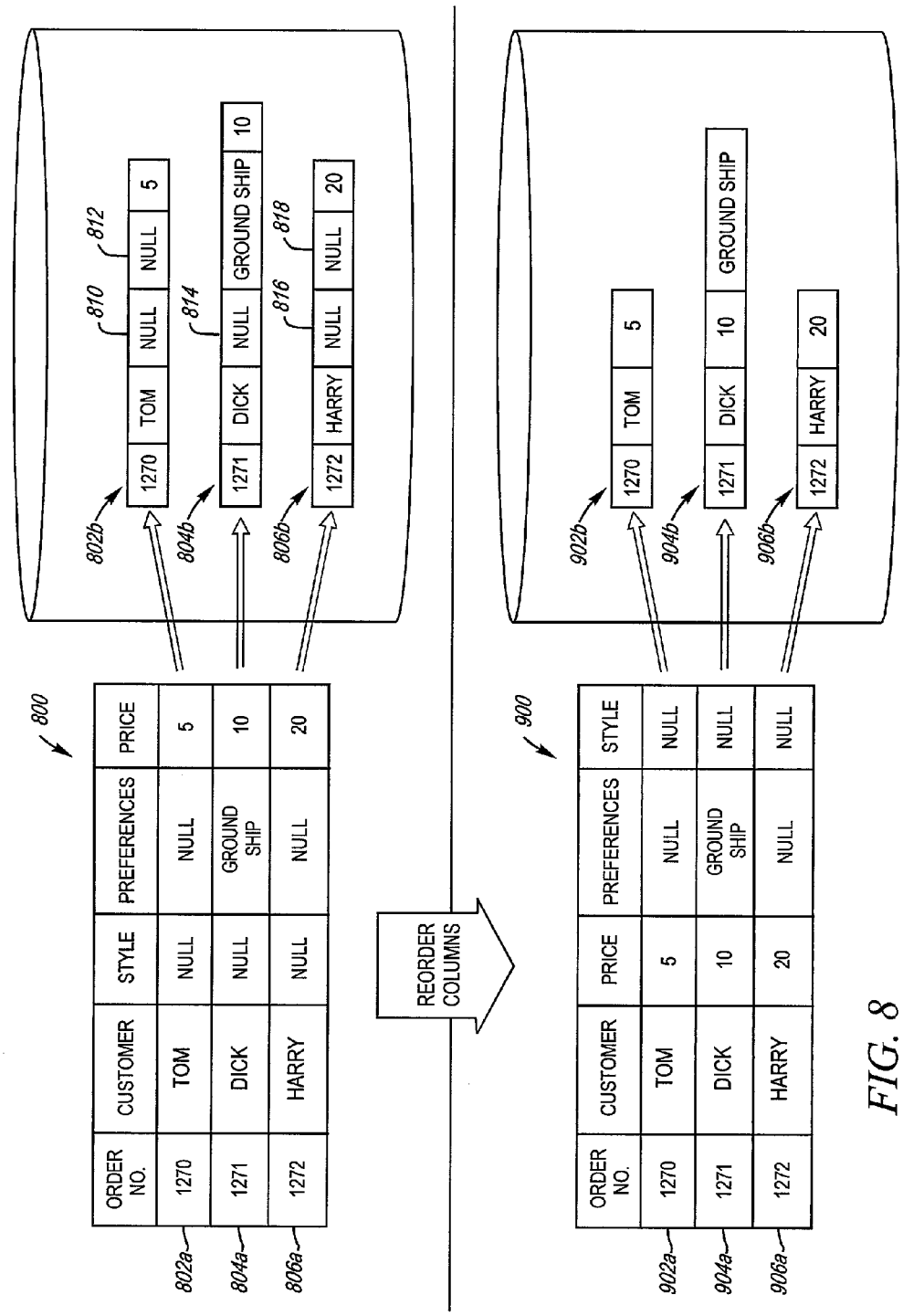
FIG. 8 illustrates column reordering and removal of trailing NULL values according to an embodiment of the invention.

To illustrate possible inefficiencies if column reordering is not performed, reference is made to table 800 in FIG. 8. Table 800 includes a set of rows 802a, 804a, and 806a that is to be written to disk. Each row includes one or more NULL values. Row 802a includes NULL values in the Style column and Preferences column. Row 804a includes a NULL value in the Style column. Row 806a includes NULL values in the Style column and Preferences column. Since none of the NULL values in these rows are trailing NULLs, when these rows are written to disk, space may be wasted in each corresponding on-disk row structure because of the NULL values. As shown, on-disk row structure 802b, which corresponds to row 802a, includes two spaces 810 and 812 that have been allocated for the NULL values corresponding to the values in the Style and Preferences columns for row 802a. On-disk row structure 804b, which corresponds to row 804a, includes a space 814 that has been allocated for the NULL value corresponding to the value in the Style column of row 802a. On-disk row structure 806b, which corresponds to row 806a, includes two spaces 816 and 818 that have been allocated for the NULL values corresponding to the values in the Style and Preferences columns for row 806a.

Column reordering can be performed to increase the compression efficiency of storing table 800 to disk. The first step is to sort the columns to identify specific columns having larger numbers of NULL values. Here, it can be seen that the Style column in table 800 has the largest number of NULL values (with NULL values for every row). The Preferences column has the next largest number of NULL values (with NULL values in rows 802a and 806a). None of the other columns include NULL values.

The columns are reordered to place the columns with the larger number of NULL values closer to the end of the rows. Table 900 illustrates the result of performing this action on table 800. In particular, the columns are reordered such that the Style column, with the largest number of NULL values, is placed at the end of the rows. The Preferences column, with the next largest number of NULL values, is placed second-to-last in the sequence of columns. None of the other columns are reordered since they do not contain NULL values.

This type of reordering has maximized the number of trailing NULL values in the table. Now, rows 902a and 906a in table 900, which correspond to rows 802a and 806a respectively in table 800, both include two trailing NULL values. Rows 802a and 806a did not originally contain any trailing NULL values. Row 904a in table 900, which corresponds to row 804a in table 800, includes one trailing NULL value. Rows 804a did not originally contain any trailing NULL values.

When the rows 902a, 904a, and 906a in table 900 are written to disk, the trailing NULL values can be removed from the on-disk versions of each row. Thus, on-disk row structure 902b, which corresponds to row 902a in table 900, excludes the NULL values for the Preferences and Style columns. On-disk row structure 902b only includes three fields to store the data values "1270", "Tom", and "5" for the Order Number, Customer, and Price columns, respectively. This is contrast to the on-disk row structure 802b, its equivalent before column reordering, which includes five fields to store the data values "1270", "Tom", "NULL", "NULL", and "5" for the Order Number, Customer, Style, Preferences, and Price columns, respectively.

On-disk row structure 904b, which corresponds to row 904a in table 900, excludes the NULL value for the Style column. On-disk row structure 904b only includes four fields to store the data values "1270", "Dick", "10", and "Ground Ship" for the Order Number, Customer, Price, and Preferences columns, respectively. This is contrast to the on-disk row structure 804b, its equivalent before column reordering, which includes five fields to store the data values "1270", "Dick", "NULL", "Ground Ship", and "10" for the Order Number, Customer, Style, Preferences, Price columns, respectively.

Like on-disk row structure 902b, on-disk row structure 906b, which corresponds to row 906a in table 900, excludes the NULL values for the Preferences and Style columns. On-disk row structure 906b only includes three fields to store the data values for the Order Number, Customer, and Price columns, which is in contrast to the on-disk row structure 806b, its equivalent before column reordering, which includes five fields to store the data values for the Order Number, Customer, Style, Preferences, and Price columns.

Illustrative Embodiment

The following provides implementation details for an embodiment of the invention. In this embodiment, a block data format is employed that allows for various data compression schemes. The data block format can be applied as an extension to existing block formats for existing systems. The data block format defines how row pieces are stored in data blocks. The block header includes fields that indicate whether any or all of the following features are used in a particular block:
   block level compression
   block level column reordering
   intra-row run-length NULL compression Column Reordering If the column reordering indicator is set, the block uses block-level column reordering. Having a set of row pieces N columns each, a block-level permutation of the column numbers provides column reordering. If a block uses column reordering, two arrays can be stored directly after the block header. The first array stores the lengths of leading columns (ub2 Lens[fixed_width_column_count]). The first fixed-_width_column_count >=0 columns in a block in the present embodiment are fixed length columns within the block. In this embodiment, the value of fixed_width_column_count can be zero. The second array stores column number permutation for the block (ub1 Perms[block-level_column_count]).

Column reordering provides at least two advantages. First, column reordering allows higher compression by grouping appropriate columns together. Second, column reordering improve Nth column access by moving fixed-length columns in front of variable-length columns. If the first set of columns have fixed length within the block, these lengths can be stored once in the block instead of in each row. These lengths can be stored in the length array. These arrays can be considered part of block header for space computations purposes.

Another advantage of column reordering is that if a column is NULL in all row pieces in a block, then it is can be effectively "compressed out" from all row pieces because a NULL column does not have any data and its length can be stored in the length array. Moving block-level fixed column lengths from row pieces to a block-level array may provide relatively cheap compression, which can be particularly effective if column values are short, which occur if the data is highly numeric.

In one embodiment, rows that are column reordered should have equal column counts and the corresponding columns should have equal lengths. However, it is not necessary in all embodiments that all row pieces in a given block have these properties, since Insert and Update operations that violate this requirement may become inefficient under this approach. Therefore, in alternate embodiment, row pieces are allowed in a column-reordered block that do not satisfy the reordering requirement. For column-reordered block, these row pieces are excluded from reordering. These row pieces are not excluded from compression if the block is both reordered and compressed. Therefore, rows are allowed that only partially satisfies the fixed length requirement. Each row in column-reordered block is associated with a designated field identifying how many leading columns in the row have lengths obeying the block-level column length array parameter. In one embodiment, column reordering does not apply to forwarding row pieces and deleted row pieces. Column reordering also does not apply to row pieces that are explicitly excluded from reordering.

The variable part of the new data layer header includes permutations stored in the perms array and fixed width column lengths stored in the lens array. For a block with N column rows having M fixed length columns, the variable part takes sizeof(ub1)×N+sizeof(ub2)×M bytes. Assuming sizeof(ub1)×N+sizeof(ub2)×M_3×N the space taken (referred to as VARSPACE(M,N)) does not exceed 3×N. By not storing fixed width column lengths inside row pieces, at least M bytes per row can be saved. For a block with K column-reordered rows the savings can be at least (M−1)×K bytes (M−1 because there is a per-row piece fixed length column count in a ub1). In an embodiment, the break-even point is at K=5, with additional saving occurring for K>5.

In one embodiment, the process should be configured such that column-reordered data does not consume more space than uncompressed data.

As noted above, the first array lens (ub2 lens[fixed_width_column_count]) contains fixed column lengths for the block for the first n columns (where n=fixed_width_column_count). Instead of storing column lengths in each element of the array, prefix sums can be stored for the column lengths using a non-commutative summation to work around possible NULL values, as follows:

lens[0]←SIZEOF(column[0]),
lens[k]←lens[k−1]⊕ SIZEOF(column[k]), k>0 where SIZEOF(col)-0×8000 if the column is NULL, and the summation ⊕ operation carries 0×8000 bit from the right operand only, i.e. ⊕ is not commutative.

For example, consider a sequence of 10 fixed width column lengths as follows:

5, 5, 12, 7, NULL, NULL, 4, NULL, 4, 6, the array will contain the following values:

5, 10, 22, 29, 32797, 32797, 33, 32801, 37, 43

Extracting Nth column length from this array is performed as follows. First, for k<fixed_width_column_count, lens[k]& 0×8000 is tested to detect if the column k is NULL. If it is not NULL, then its length is:

len←lens[k]−(lens[k−1] & 0×7FFF), k>0 or len←lens[0], k=0

If there are many fixed width columns in a block, then the array can consume a significant amount of space. There are potential advantages for using fixed length column reordering, e.g., to compress out long sequences of NULL columns by rotating globally NULL columns to the end and subsequently performing truncation of trailing NULL values. In general, the more fixed length columns in a block, the higher the probability that several columns will have the same column lengths.

Block Formats

If the row compression indicator is set in the block header, then this indicates that all or part of the rows in the block is compressed. For only the purpose of the following explanation, assume that a given block is column reordered, the block's columns 0 through (fixed_width_column_count−1) are of fixed length and the rest of the columns are of variable length. Further assume that columns 0 through (fixed_width_column_count−1) have their lengths removed and stored in the block-level array lens. The rest of the columns have their lengths stored within the row itself. In an embodiment, the following are defined to the row piece formats for the block:

define SHORT INDEX 200
define SHORT_LENGTH 250
define LONG_INDEX 251
define LONG_LENGTH SHORT_LENGTH The value of SHORT_INDEX is an index into the symbol table. For values L ∈ [SHORT_INDEX, SHORT_LENGTH), len←(L−KDRCS SHORT INDEX) is the length of an in-place stored column (i.e., uncompressed column). The value of LONG_INDEX indicates that the next 2 bytes contain an index value into the symbol table. The value of LONG_LENGTH indicates that an uncompressed column (with length bytes first) follows. The column count field in the row header contains count of column length first bytes present in the row.

In one embodiment, a symbol table is table[0] with rows in data layer sense. Rows in the symbol table do not have flag bytes or lock bytes. For the flag byte, locking of symbol table entries can be implemented, e.g., by obtaining data block locks. In one embodiment, concurrency loss can be incurred for symbol table operations if operations on the symbol table are not unduly frequent. Flag and lock bytes of symbol table rows can contain a reference count stored as ub2. In an embodiment, symbol table rows are similar to row piece formats, except for the following constants used to partition first length byte values into ranges:

define SYMTAB_SHORT_INDEX 200
define SYMTAB_SHORT LENGTH 250
define SYMTAB_LONG_INDEX 251
define SYMTAB_LONG_LENGTH SYMTAB_SHORT_LENGTH Interpretation for the first length bytes is the same as for row pieces for blocks as explained above. In addition, multiple column entries are allowed in the symbol table.

In an embodiment, compression of prefix, fixed length columns differs from compression of other columns. The difference occurs because the lengths are removed from these columns. The following can be performed for compression of prefix fixed length columns by using stop bytes Bi. The first byte B0 of a row piece data is an index into the symbol table, if B0<SHORT_INDEX. Otherwise, (B0−SHORT_INDEX) is the number of in-place stored (i.e. not compressed) fixed length columns that follow. The next byte B1 either directly follows B0, or directly follows the data for pre-ceding (B0−SHORT_INDEX) columns correspondingly. This definition continues recursively while the column(s) that follow Bk are still fixed length.

Compressor

In an embodiment, at least two different approaches to compression are available. Online compression will form compressed blocks incrementally. Offline compression buffers sufficient number of rows into buffers first, and then places as many rows as practicable into a compressed block.

Online compression is attractive because it does not have to maintain additional buffers or perform additional memcopy operations. However, under certain circumstances, online compression could be very inferior to offline compression in terms of compression quality. For example, forming blocks incrementally could prevent complete pre-analysis of columns before processing, which could negatively impact the ability to efficiently perform block-level column reordering. Trying to work-around these limitations by performing block reorganizations (re-compressions) after a large portion of the block has already been formed could be excessively expensive.

The following description is with respect to offline compression, in which a bulk set of rows are processed to format one or more full data blocks. Each data column can be described as a pointer to its data in a buffer, e.g., in a source table's data blocks.

The present embodiment of the compressor is described using the following Terms:

SingleEntry (SE) is a representation of a column that has a pointer to data, data length and a few reference counts.

RowModel (RM) is a representation of a row as an array of pointers to SE and a count of SE (column count).

RowSetModel (RSM) is a representation of a set of rows as an array of pointers to RM and row count.

RSM Construction.

As the Compressor module buffers rows for offline compression, it builds an RSM for the set of rows. Each row column is looked up in a hash table, and if not present, a new SE is allocated for the column, otherwise a pointer to an existing SE is used. Dynamic memory managers can be used to reduce fragmentation and memory allocation overheads. In one embodiment, the memory managers are for per-block temporary allocations that persist only for compression of a single block and per-segment memory that persists for the duration of segment compression.

RSM represents a set of rows as a matrix of SE pointers, where equal columns point to the same SEs. Each SE is a candidate to become a single column symbol table entry. Once the RSM is built, the symbol table can be generated consisting of single column entries based on SE reference counts. For some data sets, this will provide efficient compression as repeated SEs will be encoded through small byte indexes into the symbol table. To achieve higher compression, column sequences can be replaced with indexes into the symbol table and create multiple-column symbol table entries.

MultiEntry (ME) is a representation of a multiple-column symbol table entry candidate. It is described using a (row, column) pair of its first column, column count a few more fields. In the present embodiment, the act of compression is related to the act of identifying a set of useful MEs for a given RSM.

Several steps can be taken to perform block-level column reordering computation. In a first step (Step (A)), an empirical rule can be used to compute block-level column reordering: order columns by (column cardinality, column length cardinality). The compressor determines block-level column reordering once per RSM using this rule. In one embodiment, the following two columns c1 and c2 are considered either equal c1=c2 by this ordering rule, or column c1 can alternatively be considered more acceptable than c2:

1 1
1 2
1 1
1 2
1 1
1 2
1 1
1 2
1 1
1 2
1 1
2 2

Once step (A) is done, dictionary build-up can be performed (step (C)). This step involves identifying {ME} for RSM. An RSM can be thought of as a text over an alphabet consisting of pointers to SEs. For 8k blocks in an embodiment, the lengths of the text are approximately within 5000–10000 symbols (200–400 rows 25 columns each) and the number of distinct symbols per block is approximately within 700–900. The problem of identifying {ME} can therefore be thought of as a substitutional compression problem over an integer alphabet with alphabet size about 3 times larger than regular 1-byte alphabet (256·3 2 [700, 900]).

In an embodiment, the Compressor uses an extra step (B) between steps (A) and (C), and is also referred to herein as the "Prefix Detection" step. This step captures distinctive properties of the data set being compressed, e.g., the property of the data set including a set of rows. A distinctive property of the data set is that it is a set of rows, where columns are ordered by column cardinality in step (A).

An N-ary digital compressed search tree can be built for the set of rows $$\{r_i\}_{i=1}^n.$$

This search tree has exactly N leaves for N rows, a root node and several branch nodes. The tree can be described by the following tree construction procedure:

An empty tree contains a root node only.

After adding the first row $r_1$ to the tree, the tree contains root node, one leaf node and one edge connecting the root with the leaf. The edge is labeled with all symbols in $r_1$.

When adding row $r_2$ to the tree, add one leaf node.

If the first symbol in $r_2$ is the same as the first symbol in $r_1$, delete the old edge, add a new branch node to the tree, connect root with the new branch and connect new branch node with both leaves. Label the edge from the root to the new branch node with the longest common prefix of rows $r_1$ and $r_2$. Label edges connecting new branch node with leaves with suffixes of rows $r_1$ and $r_2$ correspondingly.

If the first symbol in $r_2$ is not the same as the first symbol in $r_1$, simply add a new edge from the root to the new leaf, labeling it with all symbols from $r_2$. Tree construction proceeds recursively for all rows in RSM.

As an example, suppose that 4 rows are added to the tree:
ABCDEFGHIJKLMNOPQRSTUVWXYZ
ABCDEFGHJJKLMNO1QRSTUVWXYZ

1BCDEFGHIJKLMNOPQRSTUVWXYZ
ABCDEFGHIJKLMNOPQRSTAAAAAA

Figure 9:
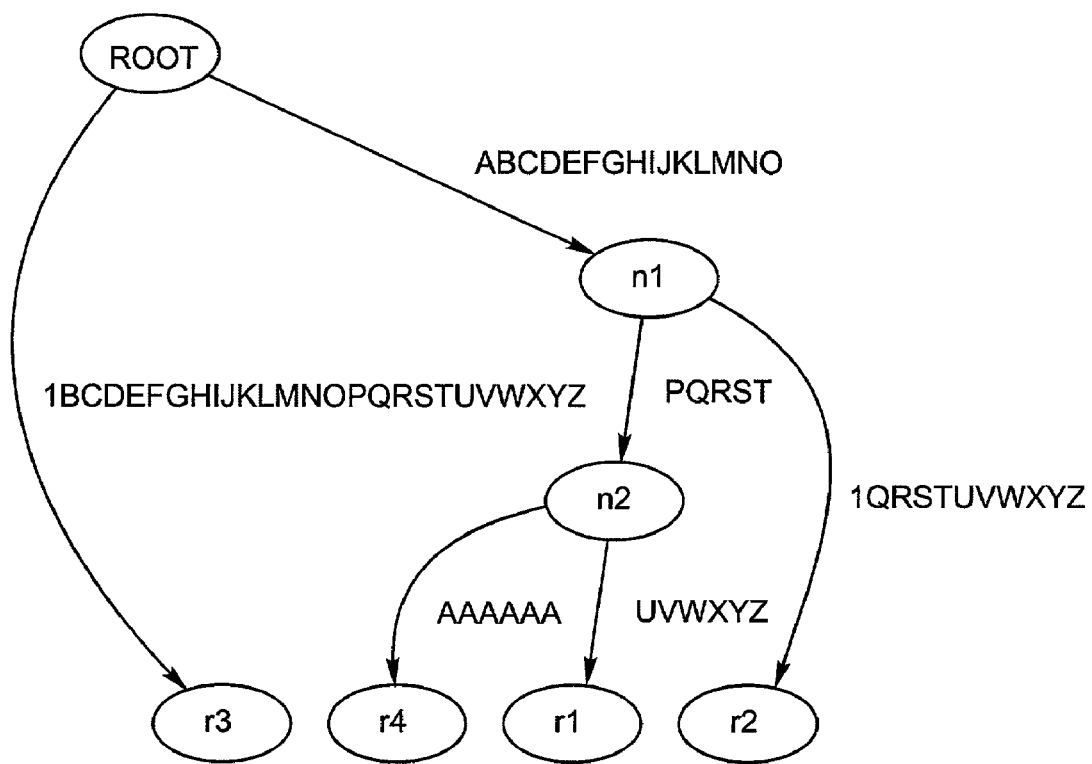
FIG. 9 shows an example search tree according an embodiment of the invention.

The tree will have two edges coming from the root node, one of them connecting root with leaf node for $r_3$ and labeled with all symbols in $r_3$, the other edge connecting root with branch node, edge labeled with symbols
ABCDEFGHIJKLMNO The two edges coming out of this branch node will be labeled with
1QRSTUVWXYZ and
PQRST correspondingly. The first edge will connect the branch with leaf for row $r_2$, the second edge will connect the branch with another branch. Finally that another branch will have two edges connecting it with leaves for $r_1$ and $r_4$, labeled
UVWXYZ and
AAAAAA correspondingly. FIG. 9 shows an example illustration of this tree.

The tree has certain properties:
Each branch node has at least two outgoing edges
The tree has at most 2·N nodes and 2·N edges
Catenation of edge labels from root to leaf gives the corresponding leaf's row symbols
If two rows share a common prefix, then paths from the root to their leaves share common edges with cumulative length equal to the maximal common prefix length.
There is a 1-1 correspondence between branch nodes and prefixes shared by at least two rows.

If each branch node of the tree is labeled with the number of leaf nodes in the subtree rooted in this node and cumulative edge length from the root to this node, then for each branch node we can immediately tell how many rows share the prefix that ends in this node. Once the tree is built, the labeling is possible in a single tree depth-first traversal, which has O(N) complexity in the number of rows N.

Once the tree is built and labeled, proceed with the prefix detection. Prefix detection is based on a simple recursive procedure. Consider the following example for 20 rows:
ABCDEFGHIJKLMNOPac
ABCDEFGHIJKLMNOPad
ABCDEFGHIJKLMNOPae
ABCDEFGHIJKLMNOPaf
ABCDEFGHIJKLMNOPag
ABCDEFGHIJKLMNOPah
ABCDEFGHIJKLMNOPai
ABCDEFGHIJKLMNOPaj
ABCDEFGHIJKLMNOPak
ABCDEFGHIJKLMNOPal
ABCDEFGHIJKLMNOPbm
ABCDEFGHIJKLMNOPbn
ABCDEFGHIJKLMNOPbo
ABCDEFGHIJKLMNOPbp
ABCDEFGHIJKLMNOPbq
ABCDEFGHIJKLMNOPbr
ABCDEFGHIJKLMNOPbs
ABCDEFGHIJKLMNOPbt
ABCDEFGHIJKLMNOPbu
ABCDEFGHIJKLMNOPbv the tree will have root node $n_0$ with one edge ($n_0$, $n_1$) coming out of it, labeled with
ABCDEFGHIJKLMNOP node $n_1$ will have two edges ($n_1$, $n_2$) and ($n_1$, $n_3$) coming out of it, edge ($n_1$, $n_2$) labeled with
a and edge ($n_1$, $n_3$) labeled with
b Nodes $n_2$ and $n_3$ will be labeled with leaf node counts of 10 and their distance from root is 17. Node $n_1$ will be labeled with leaf node count of 20 and distance from root of 16.

For this example, the following choices can be presented in construction of {ME}
Choice 1: {ME}=Ø(no MEs in the symbol table)
Choice 2: {ME}={{ABCDEFGHIJKLMNOP}} (one ME)
Choice 3: {ME}={{ABCDEFGHIJKLMNOPa}, {ABCDEFGHIJKLMNOPb}}(two MEs)
Choice 4: {ME}={{ABCDEFGHIJKLMNOP}, {#0a}, {#0b}} (three MEs)

Another tree traversal is performed to help to choose {ME}. The algorithm has a common step. At each step, one branch node is a current node. The common step consists of choosing from the following alternatives:
Alternative 1: Do not create additional MEs for which the current node is a proper prefix.
Alternative 2: Create additional MEs for which the current node is a proper prefix;
replicate the prefix that ends in the current node into these MEs.
Alternative 3: Create additional MEs for which the current node is a proper prefix;
factor the prefix that ends in the current node into a separate ME and make additional MEs point to it.

Note that for the above 20-row example,
Choice 1: Is given by Alternative 1 when the current node is $n_0$;
Choice 2: Is given by Alternative 2 when the current node is $n_0$ and Alternative 1 when the current node is $n_1$
Choice 3: Is given by Alternative 2 when the current node is $n_0$ and Alternative 2 when the current node is $n_1$
Choice 4: Is given by Alternative 2 when the current node is $n_0$ and Alternative 3 when the current node is $n_1$ Therefore, the Prefix Detection algorithm traverses the tree, chooses from the above mentioned 3 alternatives at the current branch nodes by considering
labels in the current node;
labels in all adjacent nodes in the current node's subtree non-zero cost of creating new symbol table entries and then proceeds into the subtrees. When this tree traversal reaches a leaf node, it "knows" if any prefix of the corresponding row compresses or not, and, if it compresses, which ME it compresses with. Thus, in one approach, the Prefix Detection finds all prefix MEs from optimal set of {ME} for a given block; or finds no MEs if the optimal set is empty or does not include any prefix MEs.

In an embodiment, the compressor operates by first loading a standard data block and an RSM for it parallel. After that, the compressor compresses the RSM by trying to create a new compressed block. If rows from the standard block do not fit into a new compressed block (i.e. no compression), the compressor writes a standard block and proceeds onto the next set of rows. Otherwise, an estimate is made of compression gain by comparing free space in the standard block to free space in the compressed block. If there is no or minimal compression gain, then the standard block is written and the compressor proceeds onto the next set of rows. Otherwise, if the compression gain is substantial, then estimate the number of rows that will fit into the block through interpolation and switch into buffering mode. In the buffering mode, build RSM without loading any data into blocks. Once the estimated number of rows has been buffered into RSM, try to compress the RSM again. Three possible outcomes are:

RSM does not fit into a single compressed block.

RSM fits into a single compressed block and free space wastage is minimal.

RSM fits into a single compressed block and there is still free space to load more rows.

In the first case, start reducing the number of rows in RSM that the compressor tries to load into a single block by repeatedly bisecting [known2fit, known2notfit] interval with the start condition known2fit=number of rows in uncompressed block, known2notfit=number of rows that we estimated but that did not fit. In the second case write a compressed block and proceed to the next set of rows. In the third case, make a new estimation for the number of rows and continue buffering the RSM.

Each individual block compression involves executing step (A), step (B), substituting detected prefix in RSM and feeding the resulting RSM to step (C).

Decompressor

The present invention allows very fast, low overhead decompression of compressed data. In an embodiment, column values/lengths are readily available in the block. Therefore, the decompression process is a matter of locating these values by interpreting block header bits, fixed column and column permutation arrays if present, and first length bytes in the row and symbol table entries this row references. These referenced data values can be returned without performing any costly decompression or reconstruction algorithms.

System Architecture Overview

Figure 10:
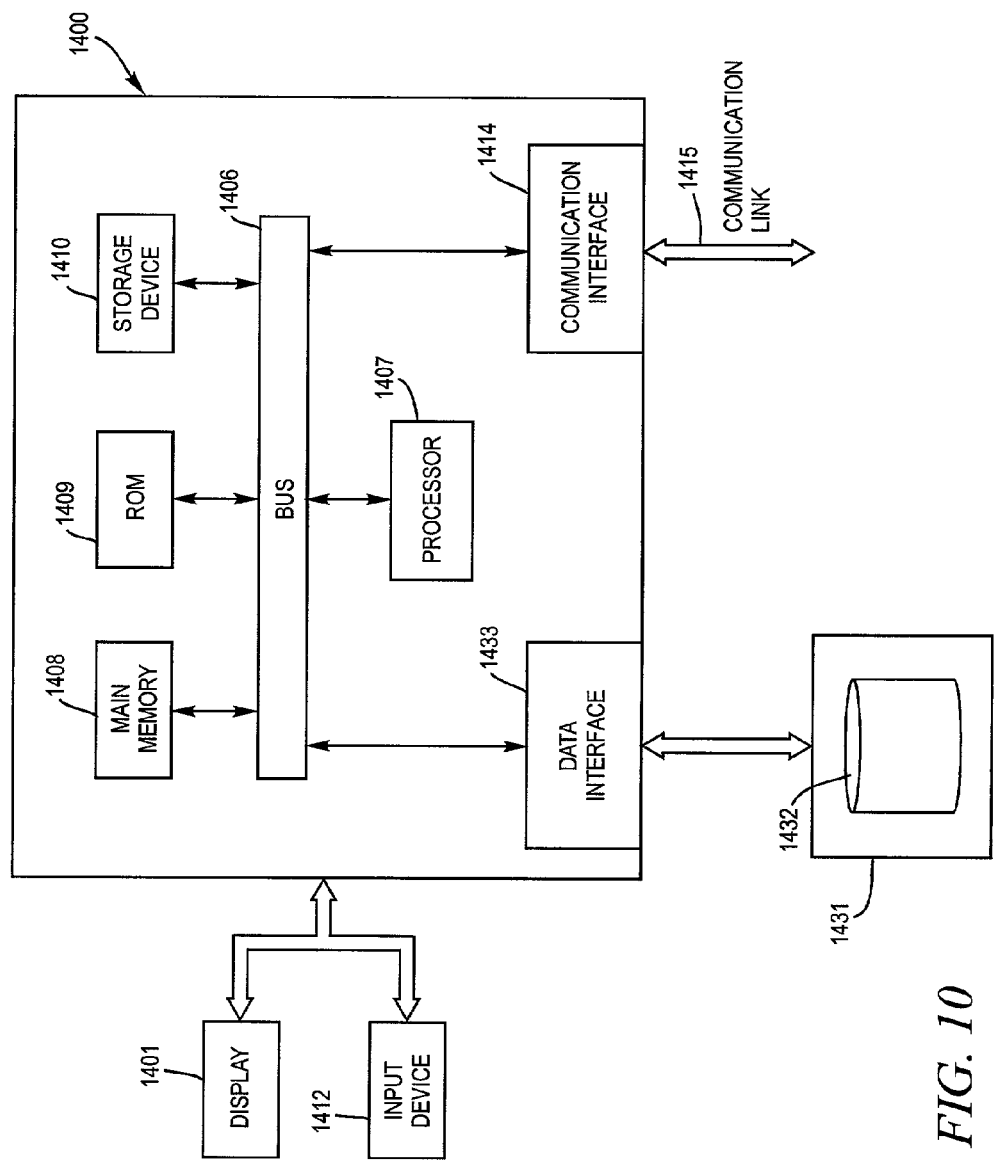
FIG. 10 is a diagram of a computer system with which the present invention can be implemented.

The execution of the sequences of instructions required to practice the invention may be performed in embodiments of the invention by a computer system 1400 as shown in FIG. 10. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 10, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

We claim:

1. A method for storing data in a compressed format, comprising:
    receiving a request to store data onto one or more database blocks on disk;
    analyzing the data to determine the existence of a redundant data item;
    reordering the data to change the order of two or more columns within the data;
    creating a symbol structure to store the reordered redundant data item;
    formatting an on-disk data structure corresponding to the data; and
    associating the on-disk data structure with a reference to the redundant data item stored in the symbol structure, wherein the on-disk data structure does not explicitly include a copy of the redundant data item.

2. The method of claim 1 in which a link or pointer is used to reference the redundant data item stored in the symbol structure.

3. The method of claim 1 wherein the data comprises relational data having one or more rows.

4. The method of claim 3 wherein each row is processed in-line.

5. The method of claim 3 in which a group of rows are processed off-line.

6. The method of claim 1 in which the cardinality of the data is considered for reordering.

7. The method of claim 1 in which the symbol structure comprises an entry that recursively references another entry in the symbol structure.

8. The method of claim 7 in which the entry references multiple other entries in the symbol structure.

9. The method of claim 7 in which the entry comprises both the stored redundant data item and the entry that recursively references another entry in the symbol structure.

10. The method of claim 7 comprising a second on-disk data structure that is associated with the entry that recursively references another entry in the symbol structure.

11. The method of claim 7 further comprising a second on-disk data structure in which multiple fields within the on-disk data structure is collectively associated with a reference with the entry that recursively references another entry in the symbol structure.

12. The method of claim 1 in which data columns are reordered to increase the likelihood of trailing NULL values.

13. The method of claim 1 in which data columns are reordered to increase likelihood of repeating sequences for the multiple fields within the on-disk data structure.

14. The method of claim 1 in which column reordering is performed at the level of the database block.

15. The method of claim 1 in which a trailing NULL value is not included in the on disk data structure.

16. The method of claim 1 in which the database block comprises metadata indicating whether compression is being applied.

17. The method of claim 16 in which the metadata comprises a single bit.

18. The method of claim 1 in which the database block comprises metadata indicating whether columns are being reordered.

19. A method for retrieving data stored in a compressed format, comprising:
    receiving a request to retrieve data from one or more database blocks on disk;
    analyzing the request to determine the one or more data blocks to access;
    analyzing the one or more database blocks to determine whether compression is being applied;
    retrieving the on-disk data structure corresponding to the data; and
    for a redundant data item referenced by the on-disk data structure, retrieving the redundant data item from a symbol structure, the symbol structure including one or more entries that reference another entry in the symbol structure.

20. The method of claim 19 in which a link or pointer is used to reference the redundant data item stored in the symbol structure.

21. The method of claim 19 wherein the data comprises relational data having one or more rows.

22. The method of claim 19 in which the entry references multiple other entries in the symbol structure.

23. The method of claim 19 in which the entry comprises both the stored redundant data item and the entry that recursively references another entry in the symbol structure.

24. The method of claim 19 comprising retrieving a second on-disk data structure that is associated with the entry that recursively references another entry in the symbol structure.

25. The method of claim 19 further comprising retrieving a second on-disk data structure in which multiple fields within the on-disk data structure is collectively associated with a reference with the entry that recursively references another entry in the symbol structure.

26. The method of claim 19 in which a trailing NULL value that had previously been removed is reconstructed.

27. A method for storing data, comprising:
    receiving a request to store data, the data comprising a plurality of columns;

reordering the plurality of columns to increase the likelihood of trailing NULL values; and creating a stored version of the data, wherein the stored version of the data does not include the trailing NULL values.

28. The method of claim 27 in which the stored version of the data written to disk.

29. The method of claim 27 further comprising the act of creating metadata that indicates that the trailing NULL values are not included in the stored version.

30. The method of claim 27 further comprising the act of creating metadata that indicates that the trailing NULL values are not included in the stored version.

31. A structure for storing data on a database block, comprising:
   a symbol structure for storing a redundant data item on disk, the symbol structure including one or more entries that reference another entry in the symbol structure; and
   an on-disk data structure on disk comprising a reference to the redundant data item in the symbol structure and which does not store redundant data.

32. The structure of claim 31 in which a link or pointer is used to reference the redundant data item stored in the symbol structure.

33. The structure of claim 31 wherein the data comprises relational data having one or the more rows.

34. The structure of claim 31 in which the entry references multiple other entries in the symbol structure.

35. The structure of claim 31 in which the entry comprises both the stored redundant data item and the entry that recursively references another entry in the symbol structure.

36. The structure of claim 31 comprising a second on-disk data structure that is associated with the entry that recursively references another entry in the symbol structure.

37. The structure of claim 31 further comprising a second on-disk data structure in which multiple fields within the on-disk data structure is collectively associated with a reference with the entry that recursively references another entry in the symbol structure.

38. The structure of claim 31 in which data columns are reordered.

39. The structure of claim 38 in which the data columns are reordered to increase likelihood of repeating sequences for the multiple fields within the on-disk data structure.

40. The structure of claim 31 in which a trailing NULL value is not included in the on-disk data structure.

41. The structure of claim 31 in which the database block comprises metadata indicating whether compression is being applied.

42. The structure of claim 41 in which the metadata comprises a single bit.

43. The structure of claim 31 in which the database block comprises metadata indicating whether columns are being reordered.

44. A computer program product comprising a computer usable medium having executable code to execute a method for storing data in a compressed format, the method comprising the steps of:
   receiving a request to store data onto one or more database blocks on disk;
   analyzing the data to determine the existence of a redundant data item;
   reordering the data to change the order of two or more columns within the data;
   creating a symbol structure to store the reordered redundant data item;
   formatting an on-disk data structure corresponding to the data; and
   associating the on-disk data structure with a reference to the redundant data item stored in the symbol structure, wherein the on-disk data structure does not explicitly include a copy of the redundant data item.

45. The method of claim 44 in which the symbol structure comprises an entry that recursively references one or more other entry in the symbol structure.

46. The method of claim 45 in which the entry comprises both the stored redundant data item and the entry that recursively references another entry in the symbol structure.

47. The method of claim 46 comprising a second on-disk data structure that is associated with the entry that recursively references another entry in the symbol structure.

48. The method of claim 44 in which the database block comprises metadata indicating whether columns are being reordered.

49. A system for storing data in a compressed format, comprising:
   means for receiving a request to store data onto one or more database blocks on disk;
   means for analyzing the data to determine the existence of a redundant data item;
   means for reordering the data to change the order of two or more columns within the data;
   means for creating a symbol structure to store the reordered redundant data item;
   means for formatting an on-disk data structure corresponding to the data; and
   means for associating the on-disk data structure with a reference to the redundant data item stored in the symbol structure, wherein the on-disk data structure does not explicitly include a copy of the redundant data item.

50. A computer program product comprising a computer usable medium having executable code to execute a method for retrieving data stored in a compressed format, the method comprising the steps of:
   receiving a request to retrieve data from one or more database blocks on disk;
   analyzing the request to determine the one or more data blocks to access;
   analyzing the one or more database blocks to determine whether compression is being applied;
   retrieving the on-disk data structure corresponding to the data; and
   for a redundant data item referenced by the on-disk data structure, retrieving the redundant data item from a symbol structure, the symbol structure including one or more entries that reference another entry in the symbol structure.

51. The method of claim 50 in which the symbol structure comprises an entry that recursively references one or more other entry in the symbol structure.

52. The method of claim 51 in which the entry comprises both the stored redundant data item and the entry that recursively references another entry in the symbol structure.

53. The method of claim 51 comprising a second on-disk data structure that is associated with the entry that recursively references another entry in the symbol structure.

54. The method of claim 50 in which the database block comprises metadata indicating whether columns are being reordered.

55. A system for retrieving data from a compressed format, comprising:
- means for receiving a request to retrieve data from one or more database blocks on disk;
- means for analyzing the request to determine the one or more data blocks to access;
- means for analyzing the one or more database blocks to determine whether compression is being applied; and
- means for retrieving the on-disk data structure corresponding to the data; and
- means for, when a redundant data item referenced by the on-disk data structure, retrieving the redundant data item from a symbol structure, the symbol structure including one or more entries that reference another entry in the symbol structure.

56. A computer program product comprising a computer usable medium having executable code to execute a method for storing data in a compressed format, the method comprising the steps of:
- receiving a request to store data, the data comprising a plurality of columns;
- reordering the plurality of columns to increase the likelihood of trailing NULL values; and
- creating a stored version of the data, wherein the stored version of the data does not include the trailing NULL values.

57. The method of claim 56 in which the stored version of the data written to disk.

* * * * *